Sept. 8, 1942.　　　W. L. KEEHN　　　2,295,085
LAND VEHICLE
Filed Sept. 8, 1941　　　3 Sheets-Sheet 1
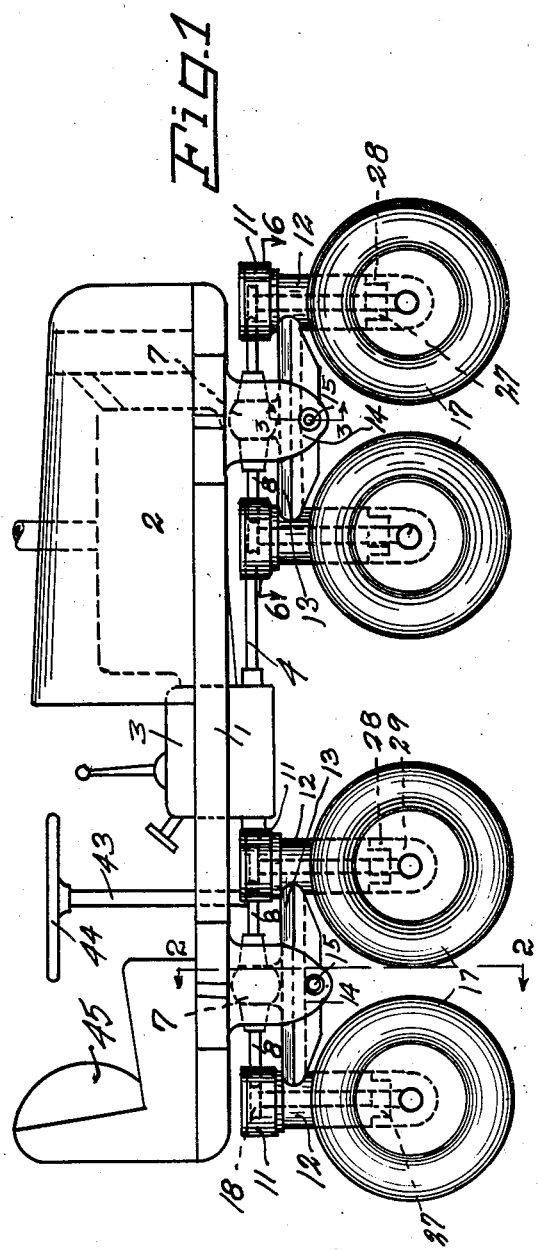
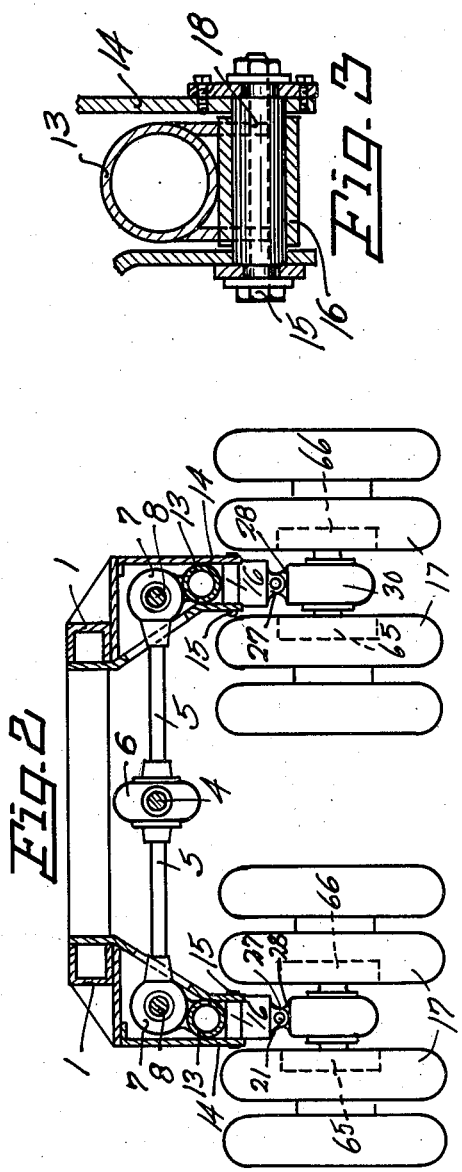
INVENTOR.
Warner L. Keehn
BY
Glenn L. Fish
ATTORNEY.

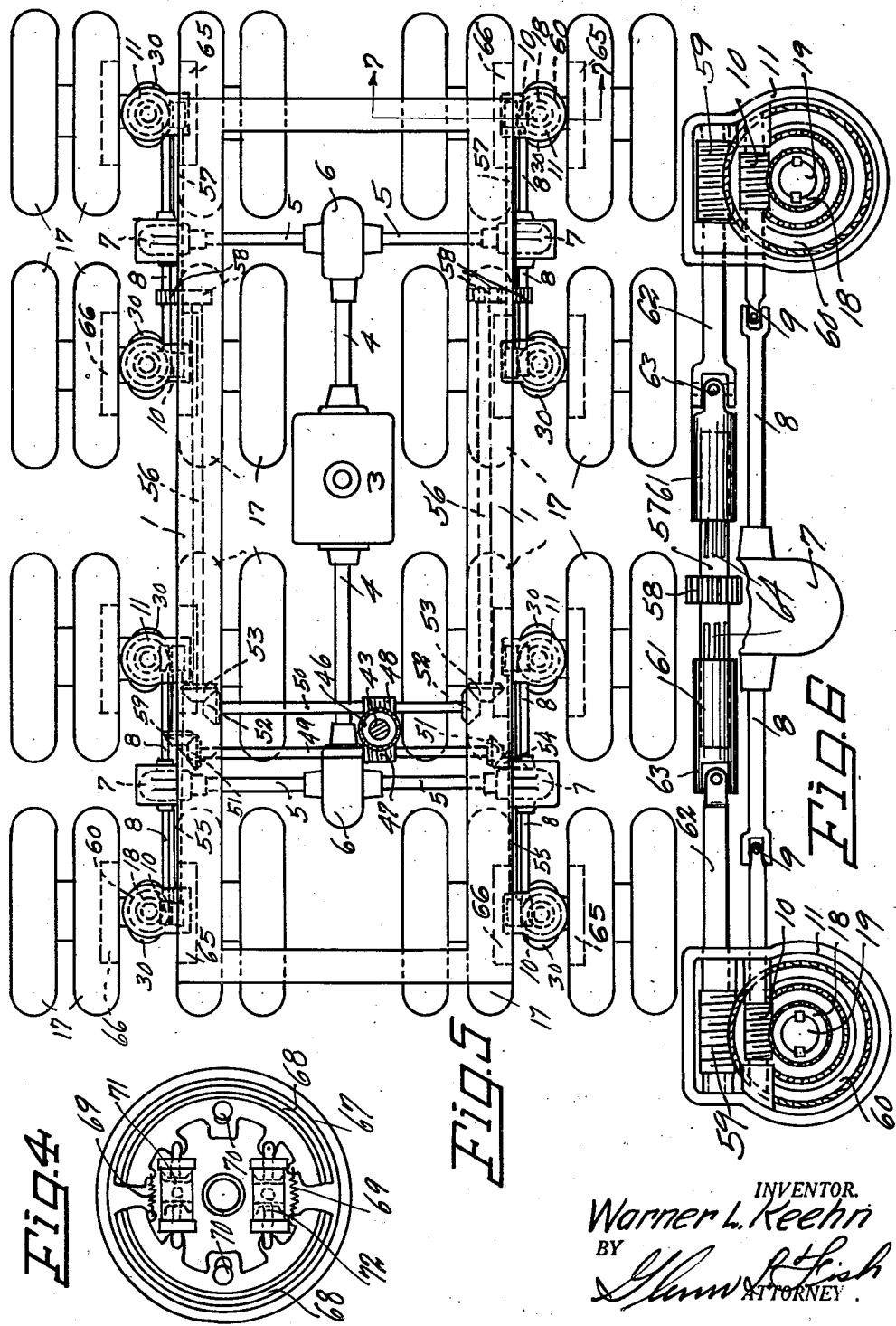

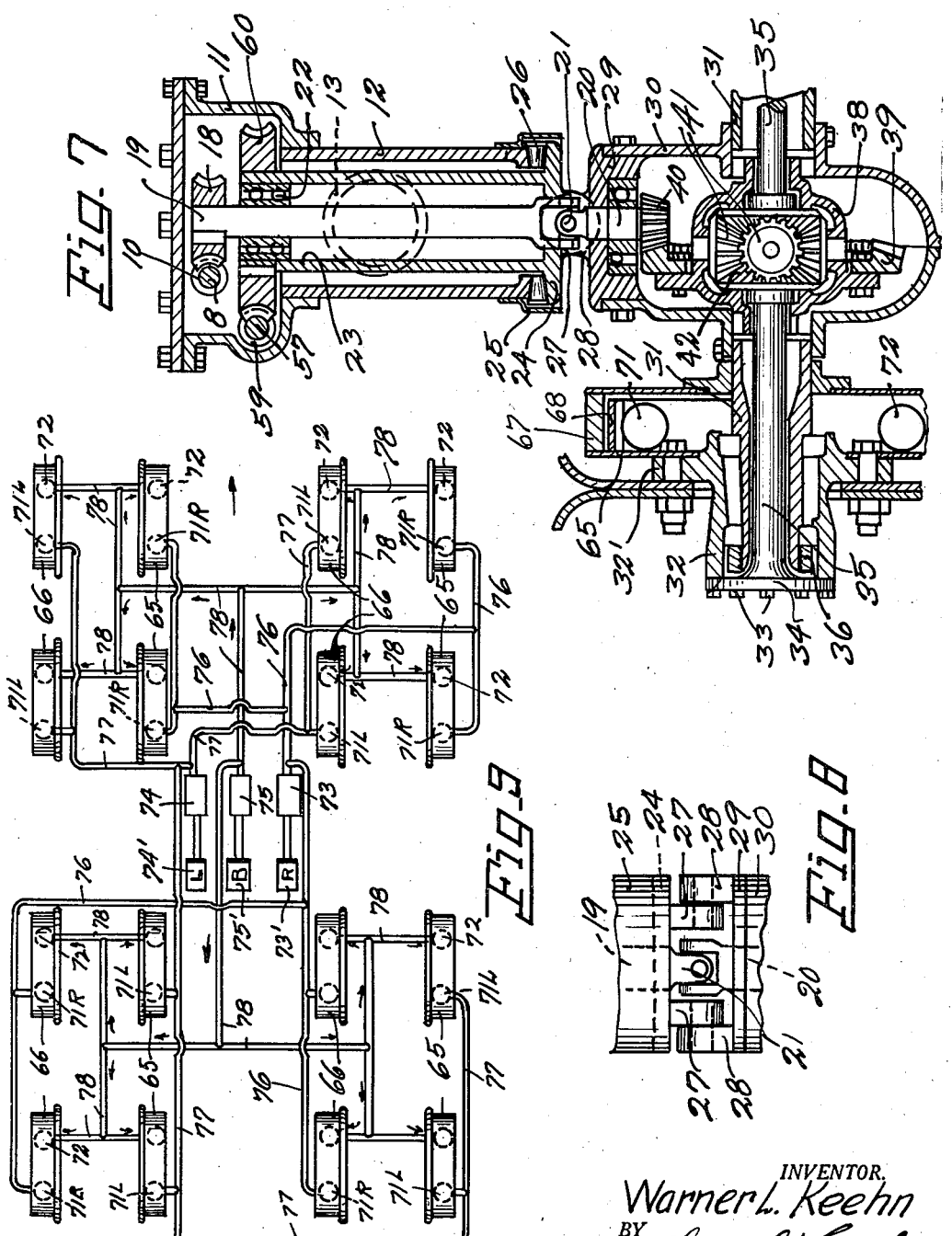

Patented Sept. 8, 1942

2,295,085

UNITED STATES PATENT OFFICE 2,295,085

LAND VEHICLE

Warner L. Keehn, Spokane, Wash.

Application September 8, 1941, Serial No. 409,980

7 Claims. (Cl. 180—23)

This invention relates to land vehicles and more particularly to improved mechanism for driving and steering a vehicle and applying hydraulic brakes to the wheels thereof.

It is one object of the invention to provide the vehicle with an improved arrangement of supporting and driving units each consisting of an improved arrangement of front and rear double wheels which are driven from the power plant of the vehicle through the medium of an improved arrangement of shafting including differentials for permitting the wheels to turn at varying speeds relative to each other.

Another object of the invention is to provide an arrangement of supporting and driving units wherein the units are mounted for tilting movement which permits the wheels of a unit to follow unevenness in a road, field, or other surface over which a vehicle travels.

Another object of the invention is to provide an improved arrangement of driving and steering mechanism wherein they cooperate with each other to rotatably mount rotatable elements of driving and steering mechanisms and also provide a very compact arrangement of parts.

Another object of the invention is to so mount the wheels that they may be very easily removed when necessary, without disturbing other portions of the driving mechanism.

Another object of the invention is to provide an improved arrangement of brakes and actuating means therefor wherein the brakes may be all applied at once, if a stop is to be made, or the brakes of right and left hand wheels of the driving units may be applied independently of each other when right or left turns are to be made.

Another object of the invention is to provide brakes of the hydraulic type wherein each brake is provided with a pair of fluid actuated pumps or cylinders, one being actuated when a right or left turn is to be made and the other being actuated when the vehicle is to be brought to a stop by applying all of the brakes.

In the accompanying drawings:

Fig. 1 is a side elevation of a vehicle of the improved construction.

Fig. 2 is a sectional view taken transversely through the vehicle on the line 2—2 of Fig. 1.

Fig. 3 is a fragmentary sectional view on the line 3—3 of Fig. 1.

Fig. 4 is a detail view of one of the brakes.

Fig. 5 is a top plan view of the vehicle with the engine and seat removed and the steering post in section.

Fig. 6 is a fragmentary sectional view on the line 6—6 of Fig. 1.

Fig. 7 is an enlarged fragmentary sectional view on the line 7—7 of Fig. 5.

Fig. 8 is a fragmentary view in elevation of a pivotal mounting for one of the supporting and driving units of the vehicle.

Fig. 9 is a diagrammatic view of the brakes and actuating means therefor.

The motor vehicle embodying the subject matter of this invention may be a tractor, truck, or other type of motor vehicle and has the usual frame or chassis 1 preferably formed of hollow bars, as shown in Fig. 2, and may be of any desired length and width. The motor 2 is mounted in a conventional manner and associated with said motor or engine is a transmission 3 from which extend front and rear drive shafts 4 connected with front and rear cross shafts 5 by differentials 6. At ends of the cross shafts are other differentials 7 by means of which rotary motion is transmitted from the shafts 5 to shafts 8. These shafts 8 extend longitudinally of the chassis and are provided with universal joints 9 so that their outer portions may have angular movement relative to their inner portions. At their outer ends the shafts 8 carry worms 10 enclosed in gear housings 11 at upper ends of columns 12. The columns 12 are arranged in pairs connected by tubular bridging bars 13 and the bridging bar of each pair of columns is pivotally mounted in a bearing bracket 14 by a pin 15 passing through a sleeve 16 in order that the bar may have tilting movement about a horizontal axis and the wheels 17 follow an uneven surface. A spacer 18 fits about each bolt or pin 15, as shown in Fig. 3, and allows the bolts to be tightened without interfering with free tilting of the bridge bars 13.

Referring to Fig. 7, it will be seen that each shaft 8 has its worm 10 meshing with a worm gear 18 keyed to a shaft 19 which extends vertically through the companion column 12 and has its lower end connected with a short stub shaft 20 by a universal joint 21. A bearing 22 for the upper portion of shaft 19 is mounted within the upper portion of a sleeve 23 which is rotatably received in the companion column 12 and, at its lower end, carries a head 24 which is housed in a collar 25 and constitutes a lower race for a bearing 26. Ears 27 extend downwardly from the head 24 and are pivoted to ears 28 which project upwardly from the head 29 of a differential casing 30 so that the differential and the axle casings 31 extending therefrom may have tilting movement transversely of the chassis. The wheels are arranged in pairs, as shown in Fig. 5, and each pair has its hub 32 rotatably mounted about an axle casing 31 and secured by screws 33 to a disc or head 34 at the outer end of an axle 35. The collar 36 which is screwed on the outer end of the axle casing, holds the hub 32 in place about the axle casing and since the hub has bearings which engage a spindle formed by part of the axle casing, the wheels may turn freely about the casing with the axle.

Within the differential casing 30 is located a differential having a housing 38 carrying an external gear 39 meshing with a pinion 40 fixed to the lower end of the stub shaft 20. Differential gears or pinions 41 are rotatably mounted in the housing 38 and mesh with other pinions 42 which fit about and have splined connection with inner ends of the axles 35. Therefore, rotary motion will be transmitted from the shaft 19 to axles 35 which may rotate independently of each other when making a turn.

In case an axle should be broken, the bolts or screws 33 securing its head 34 to the hub of the wheels driven by this axle may be removed and the axle drawn out through the axle casing and another axle substituted without disturbing other portions of the supporting and driving mechanism for the vehicle. It will thus be understood that the vehicle has eight sets of double wheels at its front and back, carried by trucks, each truck being mounted for tilting movement longitudinally of the chassis and equipped with inner and outer axles at its front and rear carrying the double wheels and so mounted that the axles and their mountings may have tilting movement transversely of the chassis. The wheels may, therefore, follow uneven places in a road or other surface over which the vehicle is traveling and a smooth riding vehicle will be provided.

In order to manually steer the vehicle, there has been provided a steering shaft or column 43 having the usual steering wheel 44 at its upper end. The steering shaft is rotatably mounted in a substantially vertical position in front of the driver's seat 45 of the vehicle and at its lower end carries a worm gear 46 which is keyed to the shaft and meshes with worms 47 and 48 carried by cross shafts 49 and 50 which may be referred to as front and rear cross shafts. Beveled gears 51 and 52, carried by shafts 49 and 50, mesh with beveled gears 53 and 54 carried by rotatable shafts 55 and 56 which extend longitudinally of the side bars of the chassis. The shaft 56 is connected with a shaft 57 by gears 58 and the shafts 56 and 57 carry worms 59 which are housed in the gear housings 11 and mesh with worm gears 60 fixed about upper ends of the sleeves 23. Therefore, when the steering shaft 43 is turned toward the right or left, rotary motion will be transmitted to the sleeves 23 and since these sleeves are connected with the heads 29 of the housings or casings 30 by the ears 27 and 28, the housings or casings 30 will be turned about vertical axes and the axle casings swung to impart right or left guiding movement to the wheels 17. Referring to Fig. 6, it will be seen that the shafts 57 each includes in its construction, sleeves 61 which are connected with the end portions 62 of the shaft by universal joints 63 and slidably receive the splined portions 64 of the shaft so that all portions of the shaft turn together. This permits the shafts 57 to conform to movements of the shafts 8 as the wheels pass over uneven places in a road or other surface over which the vehicle is traveling. The shafts 55 are similarly constructed.

To control rotation of the wheels and resulting movement of the vehicle, there have been provided hydraulic brakes for all of the wheels, one brake being associated with each pair of double wheels. Referring to Fig. 2, it will be seen that the inner wheel of each pair of wheels carries a brake drum secured to the collar 32' of the hub 32 as shown in Fig. 7. The brakes are arranged in pairs, as shown in Figs. 2 and 9, and may be referred to as right and left brakes, the right brakes being designated 65 and the left brakes 66. Each brake has the usual brake drum 67 and brake shoes 68 which are normally drawn inwardly by springs 69 to an inoperative position. The usual pins 70 guide movement of the shoes into and out of operative position and, in order to shift the shoes outwardly into gripping engagement with the drum, there have been provided cylinders 71 and 72 having their pistons connected with the shoes so that when either of the cylinders is energized, the shoes will be shifted outwardly into gripping engagement with the drum and the brake applied. In Fig. 9, the cylinders 71 of the right hand brakes 65 have been designated 71L and the corresponding cylinders of the left hand brakes have been designated 71R. Brake actuating cylinders 73, 74, and 75 are mounted in a conventional manner and their pedals 73', 74,' and 75' extend to a position in which they may be easily reached and depressed by the driver's foot when the brakes are to be applied. These pedals are identified by the markings R, L and B, and are used respectively for applying the right brakes, the left brakes, and both or all of the brakes during operation of the vehicle. In Fig. 9, it is clearly shown that the pipes 76 leading from cylinder 73 extend to the brake cylinders 71R while the pipes 77 leading from cylinder 74 extend to the brake cylinders 71L, the pipes 78 leading from cylinder 75 being connected with all of the brake cylinders 72. By this arrangement, a right or left turn can be made by applying pressure to the pedal 73' or 74' and half of the wheels of each unit will be checked while the other wheels are allowed to turn freely during making of the turn. When the vehicle is to be brought to a stop, the middle pedal 75' is depressed and all of the brakes will be applied.

Having thus described the invention, what is claimed is:

1. In a motor vehicle, a chassis, front and rear trucks at opposite sides of said chassis mounted for vertical tilting movement longitudinally of the chassis and having lower sections mounted for tilting movement transversely of the chassis, axles rotatably mounted in the lower sections of said trucks, wheels fixed to turn with said axles, a source of driving power, and means for transmitting motion from the source of power to the axles including shafts rotatably mounted vertically in the trucks with portions housed in the upper and lower sections of the trucks and connected with each other by universal joints located between upper and lower sections of the trucks.

2. In a motor vehicle, a chassis, front and rear supporting units for said chassis, each supporting unit having front and rear columns and a bridge connecting the columns and pivotally mounted for vertical tilting movement, trucks under said columns pivotally mounted for tilting movement transversely of the direction in which the bridges tilt, axles rotatably carried by said trucks, wheels carried by said axles, means for transmitting motion from a power unit to the axles including shafts rotatably mounted vertically through the columns and into the trucks and differentials in the trucks constituting geared connections between the shafts and axles, and means for turning the trucks about axes concentric to the shafts for steering the vehicle.

3. In a motor vehicle, a chassis, front and rear supporting units for said chassis, each supporting unit having front and rear columns and a bridge connecting the columns and pivotally mounted for vertical tilting movement, trucks under said columns pivotally mounted for tilting movement transversely of the direction in which the bridges tilt, axles rotatably carried by said trucks, wheels carried by said axles, and means for transmitting motion from a power unit to said axles including shafts rotatably mounted vertically in the columns with their lower portions mounted for universal movement between the columns and the trucks and rotatably mounted vertically in the trucks, and differentials in the trucks constituting geared connections between the axles and the lower portions of the shafts.

4. In a motor vehicle, a chassis, front and rear supporting units for said chassis, each unit having front and rear columns and a bridge connecting the columns, trucks under said columns, each mounted for turning movement about a vertical axis concentric to the companion column, axles, rotatably carried by said trucks, wheels for said trucks operatively associated with said axles, means for transmitting rotary motion from a source of power to said axles including shafts rotatably mounted vertically in said columns and having lower portions rotatably carried by the trucks and geared to the axles, and means for turning the trucks about their vertical axes concentric to the shafts and the columns for guiding the vehicle.

5. In a motor vehicle, a chassis, front and rear supporting units for said chassis, each unit having front and rear columns and a bridge connecting the columns, trucks under said columns each mounted for turning movement about a vertical axis concentric to the companion column, axles rotatably carried by said trucks, means for transmitting rotary motion from a source of power to said axles including shafts rotatably mounted vertically in the columns and having lower portions extending into the trucks and geared to the axles.

6. In a motor vehicle, a chassis, front and rear supporting units for said chassis, each unit having front and rear columns and a bridge connecting the columns, trucks under said columns each having a differential housing and axle casings extending from opposite sides thereof, a head for the differential housing, a sleeve extending vertically through each column and having its lower end pivoted to the head of the associated differential housing to mount the truck for tilting movement, axles rotatably mounted in the axle casings, a differential in each differential housing geared to the companion axles, wheels for the trucks operatively associated with said axles, stub shafts rotatably mounted vertically through the heads of the differential housings, shafts rotatably mounted vertically through the sleeves with their lower ends connected with the upper ends of companion stub shafts for universal movement, means for transmitting rotary motion from a source of power including rotary shafts mounted longitudinally of the bridges with their ends entering the columns and geared to the shafts therein, and steering means for the vehicle including shafts rotatably mounted longitudinally of the bridges with their ends entering the columns and geared to the sleeves.

7. In a motor vehicle, a chassis, front and rear supporting units for said chassis, each unit having front and rear columns and a bridge connecting the columns, trucks under said columns each having a housing and axle casings extending from opposite sides thereof, axles rotatably mounted in said casings, wheels for the trucks associated with said axles, a sleeve rotatably mounted vertically in each column and having its lower end connected with the housing of the companion truck, a shaft rotatably mounted through each sleeve with its upper end projecting above the sleeve, means for transmitting rotary motion from a source of power including shafts rotatably mounted longitudinally of the bridges with their ends extending into upper portions of the columns and geared to upper ends of the vertical shafts, and steering means for the vehicle including shafts rotatably mounted longitudinally of the bridges with their ends extending into upper portions of the columns and geared to upper ends of the sleeves for rotating the sleeves and imparting turning movement to the trucks about their vertical axes.

WARNER L. KEEHN.